United States Patent [19]
Rose

[11] Patent Number: 6,128,609
[45] Date of Patent: Oct. 3, 2000

[54] TRAINING A NEURAL NETWORK USING DIFFERENTIAL INPUT

[75] Inventor: Ralph E. Rose, 1324 S. Winchester Blvd., #38, San Jose, Calif. 95128

[73] Assignee: Ralph E. Rose, San Jose, Calif.

[21] Appl. No.: 08/949,608

[22] Filed: Oct. 14, 1997

[51] Int. Cl.[7] .............................. G06N 3/04; G06N 3/06
[52] U.S. Cl. ............................................. 706/25; 706/23
[58] Field of Search ........................................ 706/23, 25

[56] References Cited

U.S. PATENT DOCUMENTS

| | | | |
|---|---|---|---|
| 5,283,855 | 2/1994 | Motomura et al. | 706/25 |
| 5,367,612 | 11/1994 | Bozich et al. | 706/23 |
| 5,649,066 | 7/1997 | Lacher et al. | 706/25 |

*Primary Examiner*—Tariq R. Hafiz
*Assistant Examiner*—Wilbert L Starks
*Attorney, Agent, or Firm*—Townsend and Townsend and Crew LLP

[57] ABSTRACT

A neural network is trained using a training neural network having the same topology as the original network but having a differential network output and accepting also differential network inputs. This new training method enables deeper neural networks to be successfully trained by avoiding a problem occuring in conventional training methods in which errors vanish as they are propagated in the reverse direction through deep networks. An acceleration in convergence rate is achieved by adjusting the error used in training to compensate for the linkage between multiple training data points.

17 Claims, 8 Drawing Sheets

TRAINING A NEURAL NETWORK USING DIFFERENTIAL INPUT

SOURCE CODE APPENDIX

An appendix of source code for portions of a specific embodiment are filed herewith. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to neural networks and methods for training neural networks. More particularly, embodiments of the present invention relate to training neural networks using differences in input values and differences in output values in addition to the values themselves. Further embodiments of the present invention relate to accelerated methods for training neural networks, including networks trained using differences in input values.

A neural network is a distributed information processing structure made up of computational "nodes" interconnected by unidirectional "connections". The interconnections within a neural network define the network's "topology." In a neural network, each node has one or more inputs and only one output. (Sometimes a single node is said to have more than one output, but such a single node is conceptually equivalent to multiple nodes each with one output and each with inputs from among the single node's inputs.) An output of one node may form the input of another node. As a whole, a neural network has one or more "network inputs," also called "primary inputs," and one or more "network outputs." Nodes that accept network inputs are called the "input layer" of nodes. Similarly, nodes that produce network outputs are called the "output layer" of nodes. Any node(s) between the input layer and the output layer are collectively called the "hidden layer(s)." In the remainder of this specification, neural networks will be discussed as if they each had only one network output, for simplicity. It is to be understood that all discussions and results apply also to neural networks with more than one network output, unless context demands otherwise.

A node's output is a function of its inputs. In general, a node may be designed to implement any type of mathematical function, so long as the node's computations are "local"—i.e., so long as a node's function has only the node's input values as variable inputs. Typically, interesting neural networks use nodes that implement non-linear functions.

A neural network implements a mapping from the network inputs into a network output. This mapping from inputs to output is determined by the network's topology and locally-acting node functions. A useful attribute of a neural network is that it may be "trained" using training data to learn a desired mapping. Indeed, a typical application for neural networks is the learning and subsequent implementing of a desired mapping from network inputs into a network output. For such an application, a neural network is typically trained under supervision, which means that during training, example network's input data is presented to a neural network trainer along with the corresponding desired network's output for that data. The neural network trainer is adapted to establish values for the function parameters within a neural network's nodes, based on the presented training data. The neural network trainer is adapted to use a training method for establishing function parameter values that cause the neural network to realize the desired mapping to the extent possible. The training method used must be appropriate for the neural network's node function type(s) and topology.

A standard approach to training a neural network's function parameters is to: start with a full set of function parameters, perhaps chosen at random; feed training input data into the neural network to compute an actual (or "observed") output; compute an error which is the difference between the actual and desired network's outputs; and propagate the error backward through the network according to a propagation method to adjust each node's function parameters by a function of the error such that the network, with adjusted function parameters, would produce a smaller error if given the same training inputs again.

In propagating an error backward through the layers of certain neural networks, a problem is encountered in that the effect of the error on a node's function parameter becomes smaller and smaller as the error is propagated through more and more node layers. For deep neural networks (i.e., those with many layers, e.g., greater than about 5 layers), the diminution of the error's effect may become so severe that many nodes within the neural network become effectively untrainable.

What is needed is a neural network and an associated training method that allow nodes within even deep neural networks to be trained effectively.

Conventionally, back-propagation training as described above involves adjusting network parameters for one set of training input values at a time. Adjusting parameters to improve the network's output for one set of input values in general changes the output value for other input values, too. A ramification of this effect is that after a first step of updating brings about a desirable output value for a first set of input values, a later step of updating using another set of input values will change the output value for the first set of input values once again, away from its desirable value. This phenomenon causes the training process to "converge" rather slowly, after using much training data or multiple passes through the same training data.

What is also needed is a method for training a neural network which achieves faster convergence to a final set of network parameters.

SUMMARY OF THE INVENTION

The present invention enables even deep neural networks to be successfully trained and permits dramatically faster training convergence. Training of deep neural networks is made possible by avoiding a problem occuring in conventional training methods in which errors vanish as they are propagated through deep networks. In embodiments of the present invention, the neural network is trained using a training neural network having a differential network output and accepting also differential network inputs. Acceleration in convergence rate is achieved by adjusting the error used in training to compensate for the linkage between multiple training data points.

In an embodiment of the present invention, a method is provided for training a neural network in an information processing system, the neural network including at least one network parameter, the method includes the following steps: constructing a training network from the neural network, the training network accepting differential inputs and producing a differential output; accepting training data; deriving differential input values from the training data; deriving a desired differential output value corresponding to the differential input values from the training data; running the training network using the differential input values to compute an actual differential output value; computing an differential-error, the differential-error being a difference between the desired differential output and the actual differential output; computing an adjustment value for one of the network parameters, the adjustment value including a differential-error-applied, the differential-error-applied derived at least in part from the differential-error; and adjusting the one network parameter by an amount derived at least in part from the adjustment value.

In another embodiment of the present invention, a method is provided for training parameters within a neural network, the neural network including at least one network parameter, the method including the following steps: accepting a first set of training input values and corresponding desired output value; running a training network using the training input values to compute an actual output value; computing an error, the error being a difference between the desired output value and the actual output value; computing a coupling from the first set of training input values and corresponding desired output value to a second set of training input values and corresponding desired output value; computing an error-applied from the error and the coupling; and computing an adjustment value for one of the network parameters, the adjustment value including the error-applied.

DESCRIPTION OF SPECIFIC EMBODIMENTS

In the present specification, functions and function parameters are associated with nodes. However, in the literature, function parameters (e.g., "connection weights") are sometimes associated with connections rather than with nodes. A person skilled in the art would understand that such a distinction is one of mere terminology, and that the present invention encompasses neural networks described using either terminology.

Figure 1:
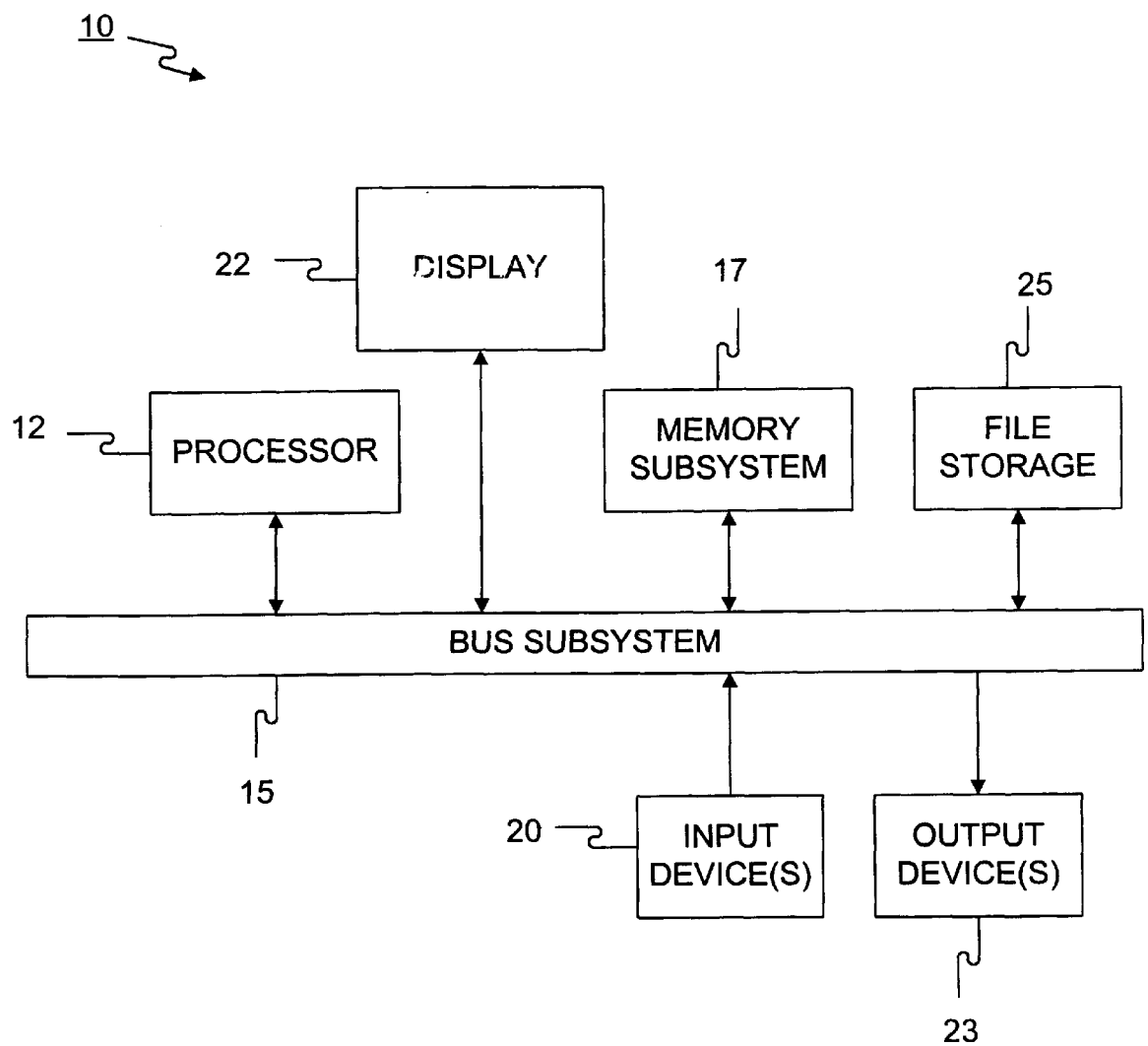
FIG. 1 is a block diagram of a computer system 10 embodying the present invention.

FIG. 1 is a simplified block diagram of an information processing system 10 in which the present invention may be embodied. The system configuration illustrated at this high level is standard, and as such, FIG. 1 is labeled "Prior Art." A computer system such as system 10, suitably programmed to embody the present invention, however, is not prior art. In accordance with known practice, the computer system includes a processor 12 that communicates with a number of peripheral devices via a bus subsystem 15. These peripheral devices typically include a memory subsystem 17, input device(s) 20, a display subsystem 22, other output device(s) 23, and a file storage system 25.

In this context, the term "bus subsystem" is used generically so as to include any mechanism for letting the various components of the system communicate with each other as intended. In general, all components need not be at the same physical location. Thus, for example, portions of the file storage system could be connected via various local-area or wide-area network media, including telephone lines. Similarly, the input devices, display, and other output devices need not be at the same location as the processor, although it is anticipated that the present invention is in some embodiments implemented in the context of PCs and workstations.

Bus subsystem 15 is shown schematically as a single bus, but a typical system has a number of buses such as a local bus and one or more expansion buses (e.g., PCI, SCSI, ISA), as well as serial and/or parallel ports. Network connections are usually established through a device such as a network adapter on one of these expansion buses or a modem on a serial port. The computer system may be a general-purpose computer or a specialized computer.

Input device(s) 20 typically include a keyboard and may further include a pointing device and a scanner. Pointing devices include indirect pointing devices such as a mouse, trackball, touchpad, or graphics tablet, or a direct pointing device such as a touchscreen incorporated into the display. Input devices in specific embodiments of the invention include audio input devices such as microphones or voice recognition systems. In particular, the input devices 20 may also include data acquisition devices that capture input data from monitored phenomena. These input data may be the product of a "data preprocessor" such as a Fourier analyzer or a speech "cepstral" analyzer that produces "feature vectors" which capture essential information characterizing a phenomena to be monitored. Phenomena which may be monitored include acoustic events or video images.

Display subsystem 22 typically includes a display controller and a display device coupled to the controller. The display device may be a cathode ray tube (CRT), a flat-panel device such as a liquid crystal display (LCD), or a projection device. Display controller provides control signals to the display device and normally includes a display memory (not shown in the figure) for storing the pixels that appear on the display device. The display subsystem may also provide non-visual display such as audio output.

Other output devices include printers, audio speakers, control signal generators, etc.

The file storage system provides persistent (non-volatile) storage for program and data files, and typically includes at least one hard disk drive. There may also be other devices such as a floppy disk drive, a CD-ROM drive, and other optical drives. Additionally, the system may include hard drives of the type with removable media cartridges. As noted above, one or more of the drives may be located at a remote location, such as in a server on a local area network or at a site on the Internet's World Wide Web.

A Neural Network

Figure 2:
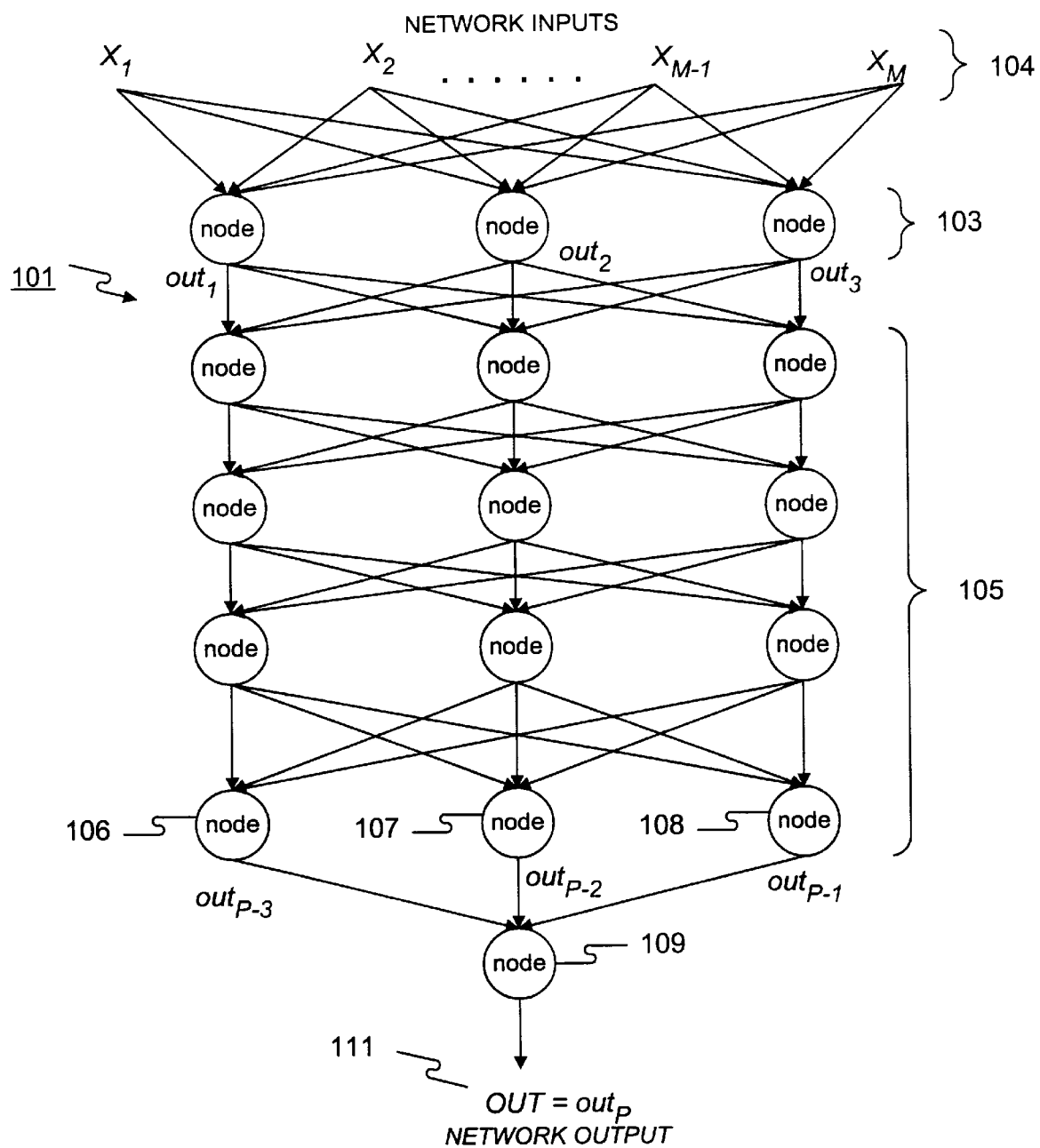
FIG. 2 illustrates an P-node neural network consistent with embodiments of the present invention.

FIG. 2 illustrates an example of a neural network 101 that is consistent with embodiments of the present invention. The example network of FIG. 2 has a number P of nodes. The example neural network contains an input layer 103 of nodes that receive M primary inputs $(X_1, \ldots, X_M) = \underline{X}$ 104. Each node i produces an output $out_i$. Hidden layers 105 of nodes accept outputs of the input layer 103 as inputs. An output layer made up of a single output node 109 which accepts outputs from nodes 106, 107, and 108 as its inputs. The output node 109 produces a single network output OUT 111. The network's output OUT is also referred to as $out_P$.

In general, a neural network according to the present invention may be less regular in its topology than is shown in FIG. 2. For example, layers within a network may have different numbers of nodes, and different nodes may have different numbers of inputs. Also, as long as no path from a network's input to the network's output includes the same node twice, it is permissible for nodes to accept input directly from other nodes, regardless of whether the other nodes are in an identifiably "immediately preceding" layer.

According to a specific embodiment of the present invention, each node within the neural network 101 implements an arithmetic function that is a linear combination of the node's inputs and at least one node contains a product of at least two of the node's inputs. For example, a node i's function may be:

$$out_i = a_{i0} + a_{i1}x_{i1} + a_{i2}x_{i2} + a_{i3}x_{i1}x_{i2} \quad (1)$$

wherein $a_{ij}$ are node i's function parameters to be established using training; $x_{ij}$ are node i's inputs (which are not necessarily primary inputs); and $out_i$ is node i's output. One benefit of using products-of-inputs such as the term $a_{i3}x_{i1}x_{i2}$ of Equation (1) to supply nonlinearity at each node is that products-of-inputs work particularly well with a "differential", training scheme according to the present invention, as will be described, because their derivatives are easily computed using closed-form (i.e., exact) expressions.

Training the Neural Network Using Non-Differential Data

The notation used in this discussion and subsequent discussions is that OUT represents the output of the network itself while $out_i$ represents the output of any node i. If the discussion is about the output of nodes in general the subscript to $out_i$ may be left off, leaving out to represent the general output of nodes used in the network.

Figure 3:
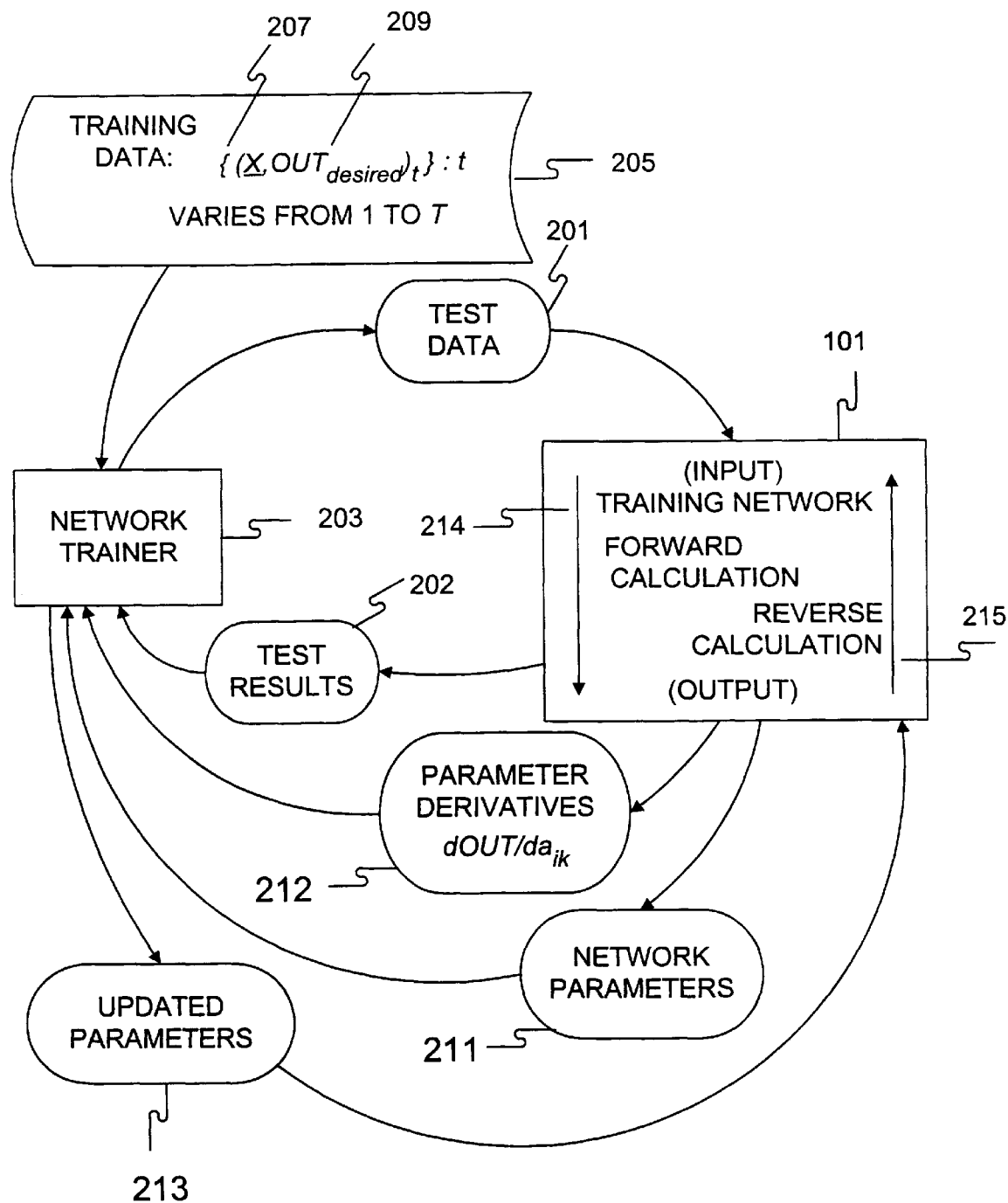
FIG. 3 is a block diagram illustrating a network trainer for establishing function parameters within the nodes of FIG. 2 using non-difference training data.

FIG. 3 is a block diagram illustrating a network trainer 203 for establishing function parameters within the nodes of FIG. 2 nodes using non-differential training data 205. Non-differential training data is also referred to as "level" or "signal level" data. Differential training data takes many forms. The form according to preferred embodiments of the present invention is difference training data, also referred to as "change in (or of) level" or "change in (or of) signal level."

In FIG. 3, the neural network trainer 203 accepts the non-differential training data 205. The training data 205 includes T "data points." Each data point t includes a set of m primary input values $(x_1, \ldots, x_m)_t = \underline{X}_t$ 207 plus the set's corresponding desired network output $OUT_{desired,t}$ 209. The neural network trainer 203 is coupled to the neural network 101 itself. Because the neural network 101 is used in the training method as shown in FIG. 3 it is also called the "training network."

Using a training method, described in detail below, the neural network trainer accepts existing neural network parameters 211 and establishes revised neural network parameters 213 which update the neural network 101. In determining the revised network parameters 213, the network trainer performs forward calculations 214 of feeding data points into the training network 101 to produce actual network output 202. The network trainer also performs a reverse calculation 215, described below, in order to compute parameter derivatives 212 used in the training method.

Figure 4:
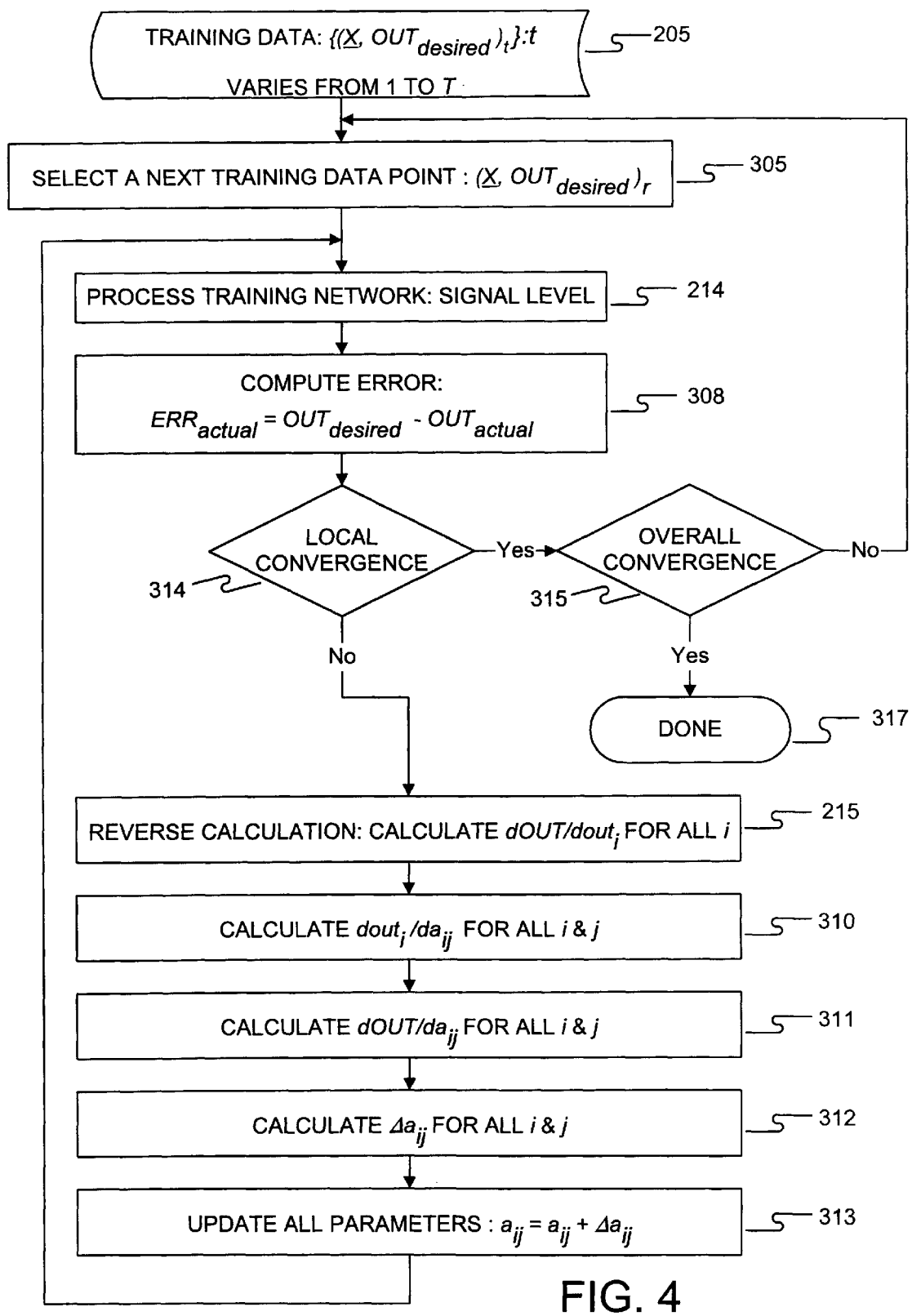
FIG. 4 is a flow chart illustrating a training method for the network trainer of FIG. 3.

FIG. 4 is a flow chart illustrating a training method for the network trainer 203 of FIG. 3. The network trainer 203 begins with initial values for function parameters $a_{ij}$ within the network. In one embodiment, the network trainer 203 simply sets all function parameters $a_{ij}$ initially to random values.

In a step 305, the network trainer 203 selects a training data point r. Then, in a step 214, the network trainer 203 presents the data point r's primary input values $\underline{X}_r$ 201 (of FIG. 3) to the neural network 101 to produce an observed network output $OUT_{actual}$. In a step 308, the network trainer 203 computes a difference ($ERR_{actual}$) between the desired network's desired output $OUT_{desired,r}$ and the network's actual output $OUT_{actual}$.

Next, in step 215, the network trainer 203 calculates the derivative of the network's output with respect to the output of every node in the network. This is a sequential procedure which starts at the lowest layer, i.e., the output layer, and proceeds backward through the network toward the network's inputs. During this procedure, in calculating the derivative with respect to the output of a node in a current layer, the results of calculations for the previous layer, i.e., the next lower layer, are used.

For each node k in the present layer:

$$\frac{dOUT}{dout_k} = \sum_{ij} \left[\frac{dOUT}{dout_i}\right]\left[\frac{dout_i}{dx_{ij}}\right] \quad (2)$$

where the summation is over all nodes i having an input $x_{ij}$ of node i that is the output $out_k$ of node k, and, for each particular node i, over all such j.

When writing a computer program to calculate the derivatives of the network's nodes with respect to the output of the network, OUT, it is necessary to set dOUT/dout for the output layer before using the values of one layer to calculate the values at the next higher layer, etc. Although FIG. 2 shows a network with exactly one output node, in general, the output layer may actually contain more than one output node. However, it is possible to conceptualize each output node separately because in any learning cycle, we are interested in finding the derivatives with respect to only one output.

Under these circumstances the value of dOUT/dout assigned to the output node of the output layer will be one (1.0), while the value of zero (0.0) is assigned to all other nodes in the output layer not currently of interest.

Next, in step 310, the network trainer 203 calculates the derivative of the output of a particular node with respect to all parameters associated with the particular node. The trainer repeats this process for every node i and all its parameters $a_{ij}$ in the network. The calculation of $dout_i/da_{ij}$ is a straightforward process of taking the derivative of the output of the equation used for that particular node, for example Equation (1), with respect to the parameter in question.

Next, in step 311, the network trainer combines the result of the steps 215 and 310 to obtain the derivative of the network's output with every parameter in the network. This is a straight forward application of the chain rules and is shown in the following equation.

$$\frac{dOUT}{da_{ij}} = \left[\frac{dOUT}{dout_i}\right]\left[\frac{dout_i}{da_{ij}}\right] \quad (3)$$

Where $dOUT/da_{ij}$ is the derivative of the network output with respect to the parameter $a_{ij}$ associated with node i.

Next, in step 312, the network trainer 203 calculates the change in value, $\Delta a_{ij}$, that should be made to every parameter, $a_{ij}$, in the network. $\Delta a_{ij}$ may also be referred to as "change $a_{ij}$". This process is shown by the following equations.

$$K = \sum_{all\ ij} \left(\frac{d\ OUT}{d\ a_{ij}}\right)^2 \qquad (4)$$

$$\Delta a_{ij} = \left(\frac{d\ OUT}{d\ a_{ij}}\right)\frac{ERR_{applied}}{K} \qquad (5)$$

The summation used in Equation (4) is over all nodes and, for each particular node i, over all j for which a parameter $a_{ij}$ exists that is associated with the particular node i. $ERR_{applied}$ used in Equation (5) is the applied error which is set equal to $ERR_{actual}$ in a particular embodiment.

Next, in step 313, the network trainer actually makes the change in the parameter values. This update process is shown in the following equation.

$$a_{ij} = a_{ij} + \Delta a_{ij} \qquad (6)$$

The above description of process steps were described in rather extensive detail. This level of detail was used to illustrate parallelism with the training procedure using differential data, to be described below.

Returning to FIG. 4, in step 314, the network trainer 203 determines whether the function parameters have sufficiently converged "locally"—i.e., with regard to the data point t. If not, the network trainer 203 repeats the process (steps 215, 310, 311, 312, 313) of updating the function parameters $a_{ij}$ and evaluating the network's output (steps 214, 308) using the same data point t until local convergence is achieved.

The network trainer 203 in step 314 determines that sufficient local convergence has occurred according to a suitable test. In an embodiment of the invention, sufficient local convergence is declared if the error $ERR_{actual}$ is less than 10 percent (or some other threshold) of its previous value using the same data point t. Other convergence conditions are possible. In an alternative embodiment, the network trainer 203 in step 314 simply causes a fixed number of successive iterations of updating to be performed for each data point t. This fixed number may be one.

Upon sufficient local convergence, the network trainer 203 determines whether the network has been sufficiently trained in a step 315. If the network has not yet been sufficiently trained, the network trainer 203 selects a next training data point in the step 305 and begins a new round of parameter updating using the next training data point. If necessary, the network trainer 203 cycles through the available training data points more than once. When the network has been sufficiently trained, as determined in the step 315, the training method is finished 317.

The network trainer 203 in step 315 according to an embodiment of the present invention determines sufficient training (i.e., overall convergence) if every training data point has been used in updating the function parameters and the mean reduction (squared) in the observed error $ERR_{desired}$ over a full cycle of updating using all training data points is less than 10 percent of the mean reduction (squared) achieved in an immediately preceding full cycle of updating using all training data points. Other overall convergence conditions are possible. In an alternative embodiment, the network trainer 203 in step 315 simply causes a fixed number of successive cycles of updating over all training data points to be performed. This fixed number may be one.

The above-described embodiments of the network trainer 203 are effective for training networks of limited depth. If asked to train networks of increased depth, these embodiments will lose effectiveness due to the problem described in the Background section involving the loss of the error's effect during error propagation.

Derivation of the Value of Constant K

The above formulas sufficiently describe how the network's parameters are updated. It may be interesting to understand the motivation, or derivation, of the constant K used in the above formulas. The formulas are based on the assumption of linear independence of the parameters being adjusted. This assumption is usually valid if the amount of change imposed on the parameters is relatively small. Based on this assumption, the amount of change in OUT that should take place as a result of change $a_{ij}$ should equal the following:

$$change\ OUT = \sum_{all\ ij} (change\ a_{ij}) \left(\frac{d\ OUT}{d\ a_{ij}}\right) \qquad (7)$$

By substituting the results of Equation (5) into Equation (7) the results is:

$$change\ OUT = \sum_{all\ ij} \left(\frac{d\ OUT}{d\ a_{ij}} \frac{ERR_{applied}}{K}\right)\left(\frac{d\ OUT}{d\ a_{ij}}\right) \qquad (8)$$

By moving the common expression to the left of the summation sign and collecting terms the results is:

$$change\ OUT = \frac{ERR_{applied}}{K} \sum_{all\ ij} \left(\frac{d\ OUT}{d\ a_{ij}}\right)^2 \qquad (9)$$

Using the results of Equation (4) in Equation (9), and cancelling terms the result is:

$$change\ OUT = ERR_{applied} \qquad (10)$$

Thus under the assumptions of this discussion, the value of change OUT should exactly equal the value of $ERR_{applied}$.

Training the Neural Network Using Difference Data

Figure 5:
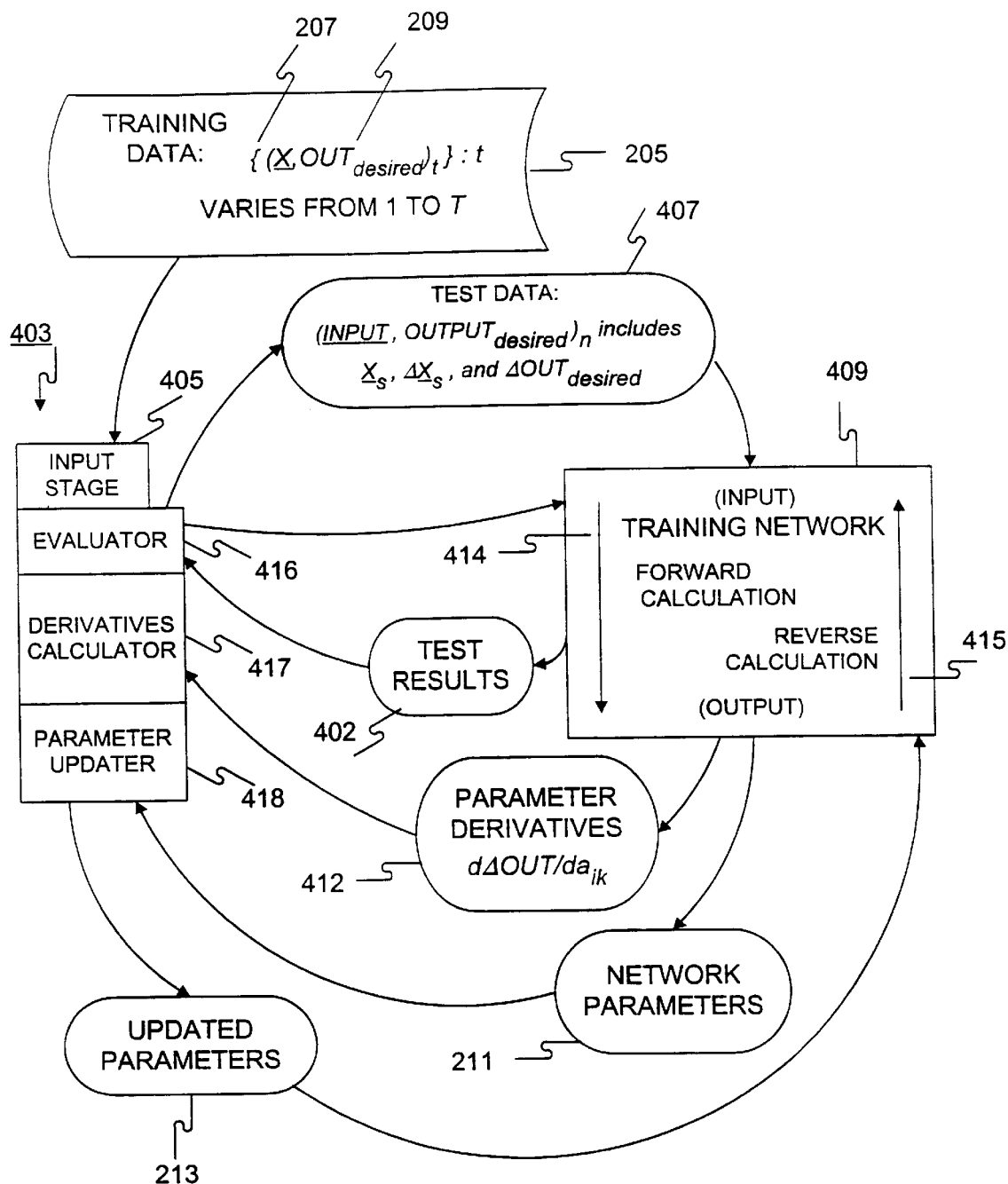
FIG. 5 is a block diagram illustrating a network trainer for establishing function parameters within the nodes of FIG. 2 using difference training data.

FIG. 5 is a block diagram illustrating a network trainer 403 for establishing function parameters within a neural network, such as the one in FIG. 2, using difference training data according to embodiments the present invention. Difference data is a particular form of differential data. The network trainer 403 of FIG. 5, as compared to the network trainer 203 of FIG. 3, permits significantly deeper neural networks to be trained without suffering the training problem described in the Background section involving the loss of the error's effect during error propagation.

In FIG. 5, a data input stage 405, coupled to or within the network trainer 403, accepts training data 205 and derives therefrom difference training data 407. In this embodiment of the invention, the input stage 405 is a data "differencer," that accepts non-difference training data and produces difference training data. (In an alternate embodiment, in which the training data 205 already includes input and desired output data in difference form, the input stage derives difference training data from the training data 205 simply by reading the training data 205—i.e., without performing any conversion.) The training data 205 includes T data points ( $\underline{X}$, $OUT_{desired})_t$ each of which includes network's input values $\underline{X}_t$ 207 and a characterization of their corresponding desired network output, in the form of the desired network output itself, $OUT_{desired,t}$ 209. The input stage 405 extracts data point-pairs 407 from the non-difference data points 205. Each data point-pair n includes two data points, $(\underline{X}, OUT_{desired})_r$ and $(\underline{X}, OUT_{desired})_s$. The two data points define an array of changes $\Delta \underline{X}$ of primary input values, and a desired change of network output value, $\Delta OUT_{desired}$.

Recall that the network trainer 203 of FIG. 3 for training using only level data obtains a "training network" for use during training that is simply the original network 101 itself. In contrast, the network trainer 403 of FIG. 5 for training using change of level data obtains a training network 409 by generating it from the original network 101. The training network 409 is generated by retaining the same topology of the original network 101 but making each node i of the training network 409 accept not only its inputs $x_{ij}$ (called "level") from the original network 101 but also additional inputs $\Delta x_{ij}$ (called "change of level"), wherein each $\Delta x_{ij}$ corresponds to one of the inputs $x_{ij}$. Similarly, each node i of the training network is configured to produce not only a level output $out_i$ but also a difference output $\Delta out_i$, which is also referred to as the change of level output.

The network inputs, referred to as $\underline{INPUT}_n$, to the training network 409 include both level ($\underline{X}_s = \{X_1, \ldots, X_M\}_s$) and change of level ($\Delta \underline{X} = \underline{X}_r - \underline{X}_s$) signals. The network output, $OUTPUT_n$, of the training network likewise is made up of level (OUT) and change of level ($\Delta OUT = OUT_r - OUT_s$) signals.

$\underline{INPUT}_n$ and $OUTPUT_n$ are more formally defined by the following equations. In the following equations, m indexes the 1 to M original network input positions; r and s index the 1 to T training data points; and n is the index of a particular point-pair.

$$\Delta X_{m,n} = X_{m,r} - X_{m,s} \tag{11}$$

$$X_{m,n} = X_{m,s} \tag{12}$$

$$INPUT_{m,n} = (\Delta X_{m,n}, X_{m,n}) \tag{13}$$

$$\underline{INPUT}_n = (INPUT_{1,n}, INPUT_{2,n}, \ldots, INPUT_{m-1,n}, INPUT_{m,n}) \tag{14}$$

$$\underline{INPUT}_n = (INPUT_1, INPUT_2, \ldots, INPUT_{m-1}, INPUT_m) \tag{15}$$

$$\Delta OUT_n = OUT_r - OUT_s \tag{16}$$

$$OUT_n = OUT_s \tag{17}$$

$$OUTPUT_n = (\Delta OUT_n, OUT_n) \tag{18}$$

The above equations for $OUTPUT_n$ apply to both the actual and the desired output of the training network 409. As indicated by the above equations, each point-pair $(\underline{INPUT}, OUTPUT_{desired})_n$ that is used to train the network 101 includes a difference $\Delta X$ for each of the network's inputs and a desired difference $\Delta OUT_{desired}$ which is the difference in output levels between the two data points r and s. The level component $OUT_{desired,n}$ of $OUTPUT_{desired,n}$ need not be used in the major portion of the training method. Instead, it is needed only in training the "0-th order" parameters, as will be described below.

The data differencer 405 generates each data point-pair 407 after data points r and s have been selected. In one embodiment of the invention, the data differencer 405 generates each data point-pair as it is required for use in training. In another embodiment, the data differencer 405 "pre-processes" all the training data 205 at once into a set of training point-pairs before training begins.

Using a training method, described in detail below, a parameter updater 418 within the network trainer 403 accepts existing neural network parameters 211 and establishes revised neural network parameters 213 which update the neural network 101. In determining the revised network parameters 213, an evaluator 416 within the network trainer 403 performs forward calculations 414 of feeding data point-pairs 407 into the training network 409 to produce actual network output 402. A derivatives calculator 417 within the network trainer performs a reverse calculation 415, described below, in order to compute parameter derivatives 412 used in the training method.

Figure 6:
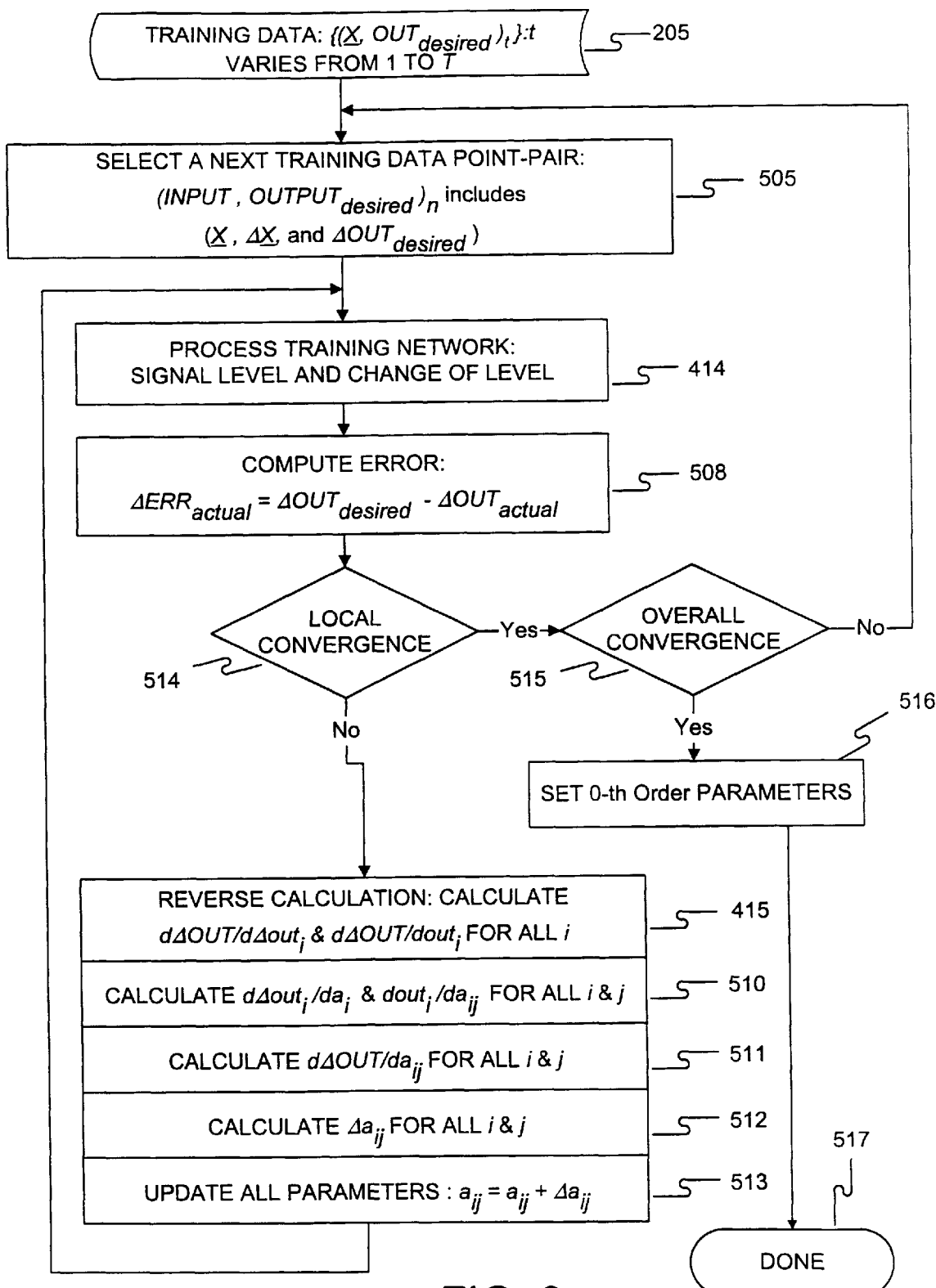
FIG. 6 is a flow chart illustrating a difference-training method for the network trainer of FIG. 5.

FIG. 6 is a flow chart illustrating a difference-training method for the network trainer 403 of FIG. 5 according to an embodiment of the present invention.

The network trainer 403 begins with initial, nonzero values for network's parameters $a_{ij}$. In one embodiment, the network trainer 403 simply sets all function parameters $a_{ij}$ to random nonzero values.

As shown in FIG. 6, in a step 505, the network trainer 403 selects a training data point-pair n and calculates the difference input and output data, $(\underline{INPUT}, OUTPUT_{desired})_n$. In a step 414, the network trainer 403 presents the data point-pair n's network's input values $\underline{INPUT}_n$ to the training neural network 409 to produce actual network outputs $OUTPUT_n$, which consists of the change of level signal, $\Delta OUT_n$, and the level signal, $OUT_n$.

Next, in step 508, the network trainer 403 computes an actual difference error, $\Delta ERR_{actual}$:

$$\Delta ERR_{actual} = \Delta OUT_{desired} - \Delta OUT_{actual} \tag{19}$$

This error is simply the difference between the desired $\Delta OUT$ and the actual $\Delta OUT$.

Next, in a step 415, the network performs a reverse calculation back up the training network starting at the network's overall output. The purpose of this process is to calculate the derivative of the network's output change signal with respect to the output signals of every node in the network. Because the output signals of the nodes include both level and change of level we are interested in finding the derivative with respect to both out and $\Delta$out. As in the calculation of the derivatives of the network using non-difference data, the calculation of the derivative of the present layer will use the values of the next lower layer, or previous layer.

$$\frac{d \Delta OUT}{d \Delta out_k} = \sum_{ij} \left[\frac{d \Delta OUT}{d \Delta out_i}\right]\left[\frac{d \Delta out_i}{d \Delta x_{ij}}\right] \tag{20}$$

$$\frac{d \Delta OUT}{d out_k} = \sum_{ij} \left[\frac{d \Delta OUT}{d \Delta out_i}\right]\left[\frac{d \Delta out_i}{d x_{ij}}\right] + \sum_{ij} \left[\frac{d \Delta OUT}{d out_i}\right]\left[\frac{d out_i}{d x_{ij}}\right] \tag{21}$$

where the summations in the above equations are over all nodes i having inputs $x_{ij}$ or $\Delta x_{ij}$ that are the outputs $out_k$ and $\Delta out_k$, respectively, of node k, and, for each particular node i, over all such j. When the equation expressing $\Delta out$ as a function of the input variables exist, the derivative of change of level output with respect to the input variables can be obtained by replacing every x in the node equation by $x + \Delta x$ and the output out by $out + \Delta out$, and then subtracting the original equation from the result.

For example, following this procedure with Equation (1) results in:

$$\Delta out = a_{i1}\Delta x_{i1} + a_{i2}\Delta x_{i2} + a_{i3}[x_{i1}\Delta x_{i2} + x_{i2}\Delta x_{i1} + \Delta x_{i1}\Delta x_{i2}] \tag{22}$$

It is now a straight forward procedure to calculate $d\Delta out/d\Delta x$ and $d\Delta out/dx$ used in the Equations (20) and (21).

When writing a computer program to calculate the derivatives of the network's nodes with respect to the output of the network, it is necessary to set the derivatives of the output layer before using the values of one layer to calculate the derivatives at the next higher layer, etc. The output layer will typically contain a number of nodes, each being trained to represent a different function. However on any learning cycle, we are interested in finding the derivatives of only one output, that output being the network output OUT during that learning cycle. Under these circumstances the values one (1.0) and zero (0.0) are assigned to $d\Delta OUT/d\Delta out$ and $d\Delta OUT/dout$, respectively, for the output node of interest in the output layer, while the values assigned to all other nodes in the output layer will be zero.

Next, in step 510, the network trainer 403 calculates the derivative of the output of each node with respect to each of its parameters. Because each node has two outputs, level and change of level, two derivatives are calculated for each parameter in the network. These derivatives are $d\Delta out/da$ and $dout/da$. The derivative of the output level out with respect to each parameter in question is obtained by taking the derivative of $out_i$ of, e.g., Equation (1) with respect to the parameter. The derivative of the change of level output with respect to each parameter is obtained by taking the derivative of $\Delta out_i$ of, e.g., Equation (22) with respect to the parameter in question.

As an example of the above procedure, the derivatives with respect to $a_{i3}$ of Equation (1) are:

$$\frac{d\,out_i}{d\,a_{i3}} = x_{i1}x_{i2} \quad (23)$$

$$\frac{d\,\Delta out_i}{d\,a_{i3}} = x_{i1}\Delta x_{i2} + x_{i2}\Delta x_{i1} + \Delta x_{i1}\Delta x_{i2} \quad (24)$$

Next, in step 511, the network trainer calculates the derivative of $\Delta OUT$ with respect to every parameter in the network. This calculation is expressed in the following equation.

$$\frac{d\,\Delta OUT}{d\,a_{ij}} = \left[\frac{d\,\Delta OUT}{d\,\Delta out_i}\right]\left[\frac{d\,\Delta out_i}{d\,a_{ij}}\right] + \left[\frac{d\,\Delta OUT}{d\,out_i}\right]\left[\frac{d\,out_i}{d\,a_{ij}}\right] \quad (25)$$

wherein $a_{ij}$ is parameter j associated with node i, and $out_i$ and $\Delta out_i$ are outputs of node i.

Next, in step 512, the network trainer 403 calculates $\Delta a_{ij}$, the value by which a parameter $a_{ij}$ is to be changed, for each parameter in the network using the following equations:

$$K_\Delta = \sum_{all\,nodes,\,all\,par} \left(\frac{d\,\Delta OUT}{d\,a_{ij}}\right)^2 \quad (26)$$

$$\Delta a_{ij} = \left(\frac{d\,\Delta OUT}{d\,a_{ij}}\right)\frac{\Delta ERR_{applied}}{K_\Delta} \quad (27)$$

In an embodiment of the invention, $\Delta ERR_{applied}$ is set equal to $\Delta ERR_{actual}$. In a later discussion these two errors will not be set equal to each other.

Next, in step 513, the network trainer 403 applies $\Delta a_{ij}$ to each parameter, $a_{ij}$, in the network using the following equation:

$$a_{ij}=a_{ij}+\Delta a_{ij} \quad (28)$$

Updating parameters $a_{ij}$ causes a correction in the network's output $OUTPUT_n$ such that the network difference output $\Delta OUT$ as evaluated for the training data point-pair n is corrected by an amount $\Delta ERR_{applied}$. The assumption contained in the section Derivation of the Constant K ensures that the correction "change $\Delta OUT$" (according an equation similar to Equation (7)) exactly corrects an error of magnitude $\Delta ERR_{applied}$ in $\Delta OUT$ for the training data point-pair n.

After the parameters $a_{ij}$ have been updated in step 513 and the network has reprocessed the same input in step 414 and the error has been calculated in step 508, the network trainer 403 in step 514 determines whether the function parameters have sufficiently converged "locally"—i.e., with regard to the data point-pair n. If not, the network trainer 403 repeats the process (steps 415, 510, 511, 512, 513) to update parameters and then (steps 414, 508) to evaluate output, using the same data point n, until local convergence is achieved.

The network trainer 403 in step 514 determines sufficient local convergence when the reduction in the error $\Delta ERR_{actual}$ from an iteration of updating using the same data point-pair n is less than 10 percent (or another threshold) of the reduction achieved in an immediately preceding iteration using the same data point-pair n. Other convergence conditions are possible. In an alternative embodiment, the network trainer 403 in step 514 simply causes a fixed number of successive iterations of updating to be performed for each data point n. This fixed number may be one.

Upon sufficient local convergence, the network trainer 403 determines whether the network has been sufficiently trained in a step 515. If the network has not yet been sufficiently trained, the network trainer 403 selects a next training data point-pair in the step 505 and begins a new round of parameter updating using the next training data point-pair. If necessary, the network trainer 403 cycles through the available training data more than once.

The network trainer 403 in step 515 determines sufficient training (i.e., overall convergence) if every desired training data point-pair has been used in updating the function parameters and the mean reduction (squared) in the actual error $\Delta ERR_{actual}$ over a full cycle of updating using all desired training data point-pairs is less than 10 percent (or another threshold) of the mean reduction (squared) achieved in an immediately preceding full cycle of updating using all training data point-pairs. Other overall convergence conditions are possible. In an alternative embodiment, the network trainer 403 in step 515 simply causes a fixed number of successive cycles of updating to be performed over all desired training data point-pairs. This fixed number may be one. In an embodiment of the present invention, the set of desired training point-pairs is a set of point-pairs such that all training points appear in at least one point-pair and all points are "connected," (e.g., 1-2, 1-3, 4-5, 5-6, and 2-5).

When the network has been sufficiently trained, as determined in the step 515, the network trainer 403 performs an additional step 516 of updating any "0-th order" parameter of the network's output node before finishing 517. The 0-th order parameter of the network's output node is not capable of affecting the network's $\Delta OUT$ and therefore must be updated separately. The 0-th order parameter is the parameter in the network whose derivative $d\Delta OUT/da_{ij}$ is zero for all input data point-pairs.

In an embodiment in which the network's output node P is implemented by the polynomial $out_P=a_{P0}+a_{P1}x_{P1}+a_{P2}x_{P2}+a_{P3}x_{P1}x_{P2}$, the network trainer 403 updates the 0-th order parameter $a_{P0}$ according to the equation $$a_{P0}=a_{P0}+ERR_{actual} \quad (29)$$

where the correction factor $ERR_{actual}$ is the network's output level error.

Example Illustrating Training Using Difference Data

Training the neural network using difference data according the invention has been described in the previous section. Reference to an example neural network will even further illustrate such training.

Figure 7:
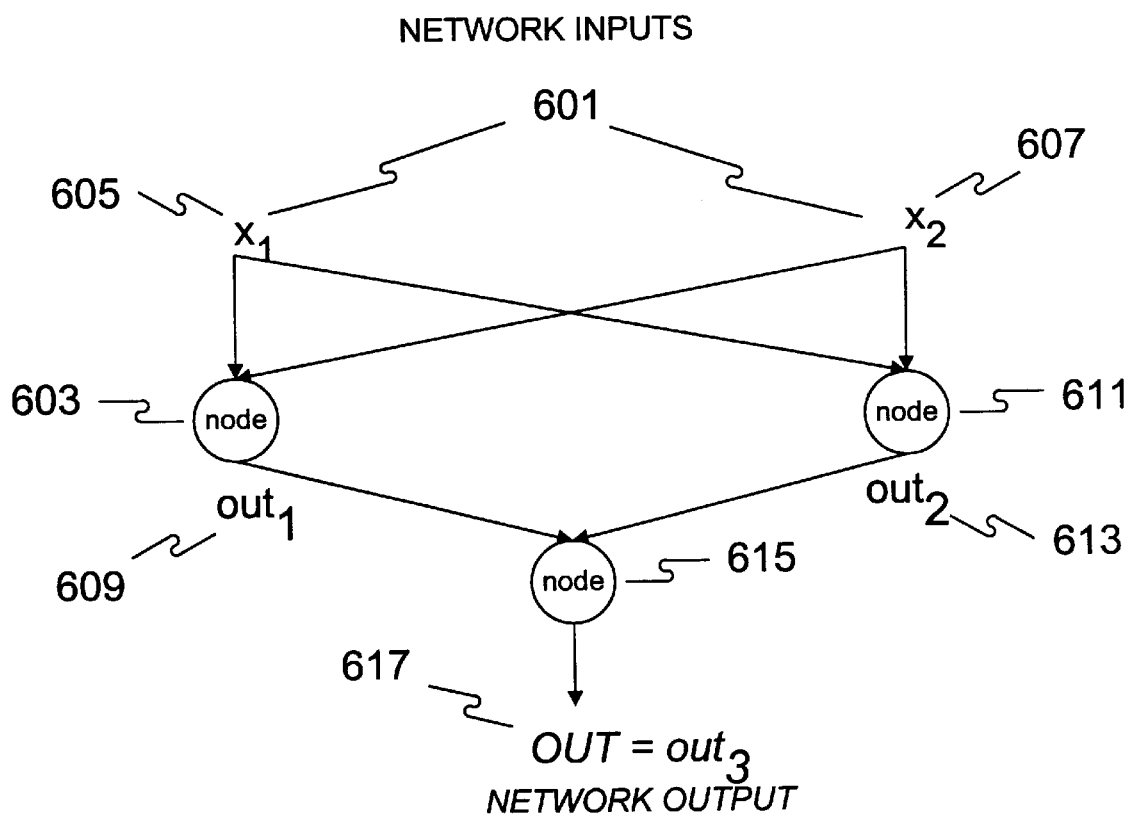
FIG. 7 illustrates an example 3-node neural network according to the present invention.

FIG. 7 illustrates an example 3-node neural network 601. In FIG. 7, a node 603 accepts network's inputs $X_1$ (605) and $X_2$ (607) and produces from them an output $out_1$, (609). A node 611 accepts the network's inputs $X_1$ (605) and $X_2$ (607) and produces from them an output $out_2$ (613). A node 615 accepts $out_1$, (609) and $out_2$ (613) as inputs and produces from them a network's output OUT (617). The network's output OUT is also referred to as $out_3$.

The node 603 realizes the following function:

$$out_1 = a_0 + a_1 X_1 + a_2 X_2 + a_3 X_1 X_2 \tag{30}$$

The node 615 realizes the following function:

$$OUT = c_0 + c_1 out_1 + c_2 out_2 + c_3 out_1 out_2 \tag{31}$$

Note that for ease of reading, the parameters $a_j$ and $c_j$ in above Equations for nodes 603 and 615 do not follow the general notation from earlier sections. According to the earlier notation, $(a_0, a_1, a_2, a_3)$ should appear as $(a_{10}, a_{11}, a_{12}, a_{13})$, and $(c_0, c_1, c_2, c_3)$ should appear as $(a_{30}, a_{31}, a_{32}, a_{33})$. Primary inputs $X_1$ and $X_2$ do follow the earlier notation in that they are collectively referred to as the network's inputs $\underline{X}$, and any two data points $\underline{X}_r$ and $\underline{X}_s$ define a difference, $\Delta \underline{X}_n = \underline{X}_r - \underline{X}_s$.

During training of this example network, the network trainer 403 (of FIG. 5), in a step 512 (of FIG. 6) calculates the value $\Delta a_3$ using Equation (27) which has been repeated in Equation (32) using the new notation for convenience.

$$\Delta a_3 = \frac{d \Delta OUT}{d a_3} \Delta \frac{ERR_{applied}}{K_\Delta} \tag{32}$$

The following equations illustrate the evaluation of $\Delta a_3$ in Equation (32). By substituting $out + \Delta out$ for $out$ and $x + \Delta x$ for $x$, and so forth, in Equation (30), the results is:

$$out_1 + \Delta out_1 = a_0 + a_1(X_1 + \Delta X_1) + a_2(X_2 + \Delta X_2) + a_3(X_1 + \Delta X_1)(X_2 + X_2)$$

By subtracting Equation (30) from Equation (33):

$$\Delta out_1 = a_1 \Delta X_1 + a_2 \Delta X_2 + a_3(X_1 \Delta X_2 + \Delta X_1 X_2 + \Delta X_1 \Delta X_2) \tag{34}$$

By differentiating Equation (34) with respect to $a_3$:

$$\frac{d \Delta out_1}{d a_3} = X_1 \Delta X_2 + X_2 \Delta X_1 + \Delta X_1 \Delta X_2 \tag{35}$$

By differentiating Equation (30) with respect to $a_3$:

$$\frac{d out_1}{d a_3} = X_1 X_2 \tag{36}$$

By repeating the above procedure to derive an equation for the output node from Equation (31), similarly to the way Equation (34) was derived from Equation (30):

$$\Delta OUT = c_1 \Delta out_1 + c_2 \Delta out_2 + c_3 (out_1 \Delta out_2 + out_2 \Delta out_1 + \Delta out_1 \Delta out_2) \tag{37}$$

By applying Equation (25) and changing notation as appropriate:

$$\frac{d \Delta OUT}{d a_3} = \frac{d \Delta OUT}{d out_1} d \Delta \frac{out_1}{d a_3} + \frac{d \Delta OUT}{d out_1} \frac{d out_1}{d a_3} \tag{38}$$

By differentiating Equation (37) with respect to $\Delta out_1$:

$$\frac{d \Delta OUT}{d \Delta out_1} = c_1 + c3[out_2 + \Delta out_2] \tag{39}$$

By differentiating Equation (37) with respect to $out_1$:

$$\frac{d \Delta OUT}{d out_1} = c3 \Delta out_2 \tag{40}$$

By substituting the results of Equations (35), (36), (39) and (40) into Equation (38), the results is:

$$\frac{d \Delta OUT}{d a_3} = [c_1 + c_3[out_2 + \Delta out_2]][X_1 \Delta X_2 + \Delta X_1 X_2 + \Delta X_1 \Delta X_2] + [C_3 \Delta out_2][X_1 X_2] \tag{41}$$

Equation (41) is then further resolved to express $out_2$ and $\Delta out_2$ in terms of $\underline{X}$ and $\Delta \underline{X}$ using equations for node 603 similar to Equations (30), (33) and (34) for node 611. Thereafter, the further-resolved Equation (41) is incorporated into Equation (32), and $\Delta a_3$ is evaluated to thereby provide an amount by which to adjust the parameter $a_3$.

Alternate Techniques for Training Network

Other embodiments of the present invention are techniques that train the network differential terms such as slope of the output, derivative of the slope, change of the change, etc. The mathematics of all these technique are very similar to the "change in level" technique discussed above, which is a preferred embodiment. An example of these alternate embodiment techniques is the use of the slope or first derivative of the level to train the network. As in the difference data technique, if the level can affect the slope then a mathematical relationship exists between the two. That mathematical relationship is the derivative of the slope with the level.

By taking the derivative of Equation (1) with respect to, say, time:

$$\frac{d out_i}{d t} = a_{i1} \frac{d x_{i1}}{d t} + a_{i2} \frac{d x_{i2}}{d t} + a_{i3} \left[ x_{i1} \frac{d x_{i2}}{d t} + x_{i2} \frac{d x_{i1}}{d t} \right] \tag{43}$$

It is then a straight forward process to take all the necessary derivatives of this equation with respect to the input variables, x and dx/dt, and parameters. But since:

$$\frac{d\left(\frac{d OUT}{d t}\right)}{d\left(\frac{d x}{d t}\right)} = \frac{d OUT}{d x} \tag{44}$$

it will not be necessary to take the derivative of Equation (43) with respect to dx/dt. As an example, calculating the derivatives of Equation (43) and (1) with respect to $x_{i2}$ is shown below:

$$\frac{d\left(\frac{dout_i}{dt}\right)}{dx_{i2}} = a_{i3}\frac{dx_{i1}}{dt} \quad (45)$$

$$\frac{dout_1}{dx_{i1}} = a_{i1} + a_{i3}x_{i2} \quad (46)$$

Thus, all necessary information for calculating the derivative of dOUT/dt with respect to every output variable of every node in the network are made available.

$$\frac{dOUT}{dout_k} = \sum_{ij}\left[\frac{dOUT}{dout_i}\right]\left[\frac{dout_i}{dx_{ij}}\right] \quad (47)$$

$$\frac{d\left(\frac{dOUT}{dt}\right)}{dout_k} = \quad (48)$$

$$\sum_{ij}\left[\frac{dOUT}{dout_i}\right]\left[\frac{d\left(\frac{dout_i}{dt}\right)}{dx_{ij}}\right] + \sum_{ij}\left[\frac{d\left(\frac{dOUT}{dt}\right)}{dout_k}\right]\left[\frac{dout_i}{dx_{ij}}\right]$$

The summation in the above equations are carried out over all nodes i having inputs $x_{ij}$ and $dx_{ij}/dt$ that is $out_k$ and $dout_k/dt$, respectively, of node k, and, for each particular node i, over all such j.

It is then a process of applying the following equation to get the derivative of the slope of the network output slope with respect to each parameter in the network.

$$\frac{d\left(\frac{dOUT}{dt}\right)}{da_{ij}} = [dOUT]\left[\frac{d\left(\frac{dout_i}{dt}\right)}{da_{ij}}\right] + \left[\frac{d\left(\frac{dOUT}{dt}\right)}{dout_i}\right]\left[\frac{dout_i}{da_{ij}}\right] \quad (49)$$

where $a_{ij}$ is the parameter associated with node i and $out_i$ and $dout_i/dt$ are outputs of node i. From this point on the procedure for calculating the change of each parameter in the network is practically identical to the difference data input procedure, and a practitioner of ordinary skill in the art will know the procedure based on the above description.

As a review, the signal supplied to the training network at its input is level and slope of level (x and dx/dt). The derivative that will be passed up the network for training, will be:

$$\frac{d\left(\frac{dOUT}{dt}\right)}{d\left(\frac{dout}{dt}\right)} \text{ OR } \frac{dOUT}{dout}, \text{ AND } \frac{d\left(\frac{dOUT}{dt}\right)}{dout} \quad (50)$$

The derivatives required from the node equations are:

$$\frac{dout}{dx} \quad \frac{d\left(\frac{dout}{dt}\right)}{dx} \quad \frac{dout}{da} \quad \frac{d\left(\frac{dout}{dt}\right)}{da}$$

The above derivative are collected for all input x variables and all parameters.

Figure 8:
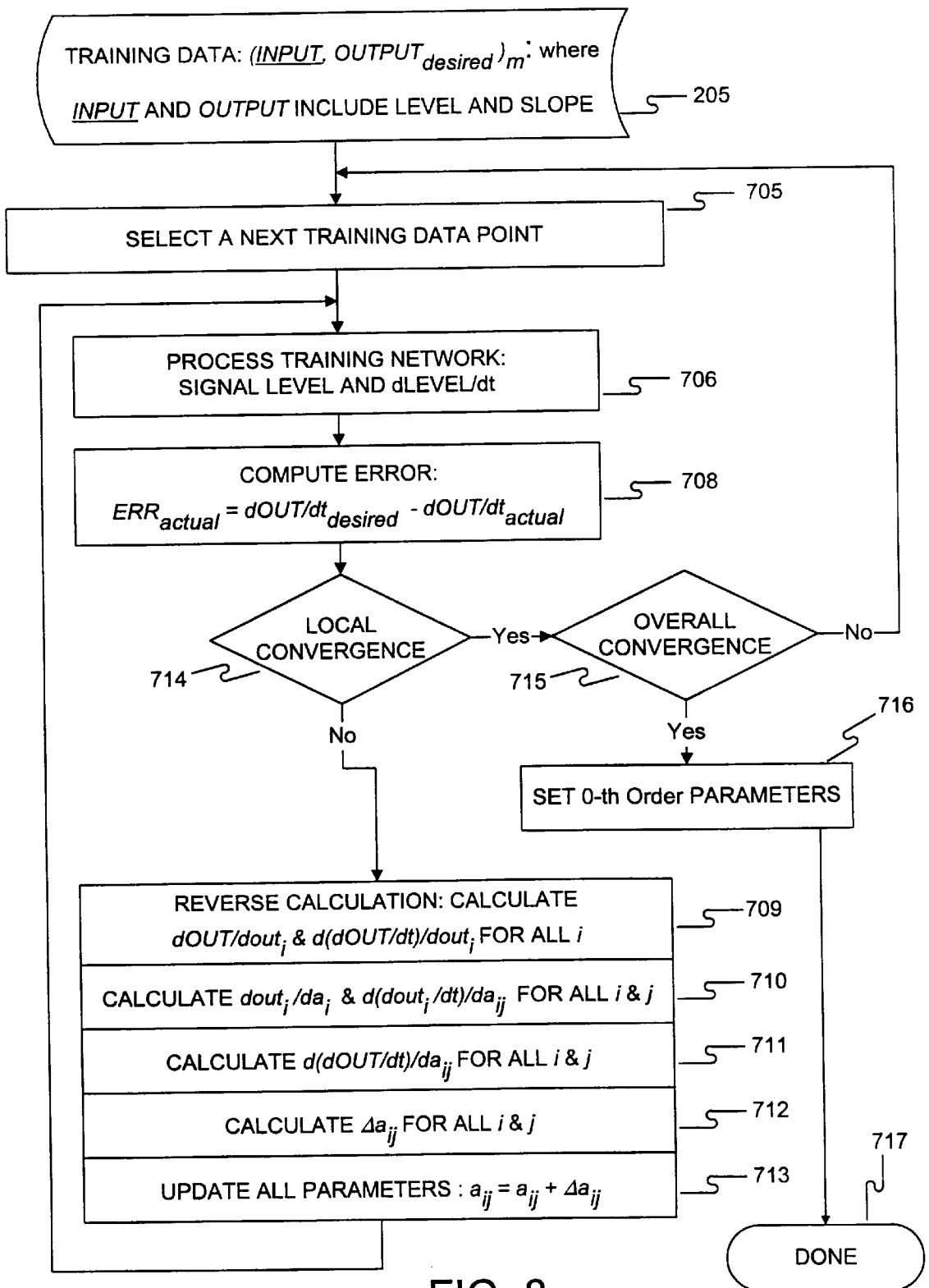
FIG. 8 is a flow chart illustrating training of a network using slope or derivative of input and output data.

FIG. 8 is a flow chart illustrating training of a network using slope or derivative of input and output data. Given all of the above description, at this point, FIG. 8 is self explanatory.

Accelerated Convergence Using Simultaneous, Linked Training

In the remainder of this section, discussion will assume training using difference data in which a training network 409 has been straightforwardly constructed from the actual network 101 as described above. A person skilled in the art would understand that the discussion applies also to training using non-difference (i.e. "level") data, wherein the actual network 101 is itself the training network used for training. To apply the discussion to training using non-difference data, the equations need only to be straightforwardly adjusted according to the minor differences between Equations (5) and (27). (In general, the equations need merely be adjusted by removing occurrances of the symbol Δ, except from $\Delta a_{ij}$.)

As described above, the network trainer 403 for difference-training updates network parameters for one training data point-pair at a time. Each updating of the parameters for a training data point-pair by definition changes the function realized by the network's output, OUT and also the function realized by the training network's output ΔOUT. The change is such that a measurement of $\Delta OUT_{actual}$ is equal to the desired output value $\Delta OUT_{desired}$ given input values $INPUT_n$, from the training data point-pair n.

Updating network parameters using one training data point-pair will in general change the network's output for all network's inputs. Therefore, similarly to prior-art training discussed in the Background section, updating network parameters for one training data point-pair v will generally, to some degree, undo the work of previous training by changing the network's output for another, previously-used training data point-pair n. As discussed in the Background section, this behavior causes the overall convergence of the network process rather slowly.

During training, updating network parameters using one training data point-pair n changes the difference output ΔOUT at data point v by an amount:

$$\text{change } \Delta OUT|_v = \sum_{all\ ij}(\Delta a_{ij})\left|_n\left(\frac{d\Delta OUT}{da_{ij}}\right|_v\right) \quad (52)$$

by analogy to Equation (7). This change in ΔOUT at data point-pair v that results from adjusting parameters at data point-pair n is:

$$\text{change } \Delta OUT|_v = \sum_{all\ ij}\left(\frac{d\Delta OUT}{da_{ij}}\Big|_n\frac{\Delta ERR_{applied,n}}{K_{\Delta,n}}\right)\left(\frac{d\Delta OUT}{da_{ij}}\Big|_v\right) \quad (53)$$

from Equation (52) and by analogy to Equation (9), wherein $|_n$ and "$,_n$" mean "evaluated at point-pair n's primary inputs," and $|_v$ means "evaluated at point-pair v's primary inputs." Substituting Equation (26) into Equation (53) gives:

$$\text{change } \Delta OUT|_v = \left(\frac{\sum_{all\ ij}\left(\frac{d\Delta OUT}{da_{ij}}\Big|_n\right)\left(\frac{d\Delta OUT}{da_{ij}}\Big|_v\right)}{\sum_{all\ ij}\left(\frac{d\Delta OUT}{da_{ij}}\Big|_n\right)^2}\right)\cdot\Delta ERR_{applied,n} \quad (54)$$

wherein $\Delta ERR_{applied,n}$ is the applied difference error used during parameter updating for the training data point-pair n, and the quantity in large parentheses is called the "coupling" $G_{n,v}$ from data point-pair n to point-pair v:

$$G_{nv} = \frac{\sum_{all\,ij}\left(\left.\frac{d\,\Delta OUT}{d\,a_{ij}}\right|_n\right)\left(\left.\frac{d\,\Delta OUT}{d\,a_{ij}}\right|_v\right)}{\sum_{all\,ij}\left(\left.\frac{d\,\Delta OUT}{d\,a_{ij}}\right|_n\right)^2} \quad (55)$$

Using matrix notation, after updating parameters for both point-pairs n and v, the observable difference output $\Delta ERR_{actual}$ for primary inputs of point-pairs n and v are:

$$\begin{bmatrix} 1 & G_{21} \\ G_{12} & 1 \end{bmatrix}\begin{bmatrix} \Delta ERR_{applied,1} \\ \Delta ERR_{applied,2} \end{bmatrix} = \begin{bmatrix} \Delta ERR_{actual,1} \\ \Delta ERR_{actual,2} \end{bmatrix} \quad (56)$$

The equation can be generalized for an arbitrary number U of point-pairs 1, . . . , U as follows:

$$\begin{bmatrix} 1 & G_{21} & \ldots & G_{U1} \\ G_{12} & 1 & \ldots & G_{U2} \\ \ldots & \ldots & 1 & \ldots \\ G_{1U} & G_{2U} & \ldots & 1 \end{bmatrix}\begin{bmatrix} \Delta ERR_{applied,1} \\ \Delta ERR_{applied,2} \\ \ldots \\ \Delta ERR_{applied,U} \end{bmatrix} = \begin{bmatrix} \Delta ERR_{actual,1} \\ \Delta ERR_{actual,2} \\ \ldots \\ \Delta ERR_{actual,U} \end{bmatrix} \quad (57)$$

This is a linear equation wherein the errors on the right are the product of coupling coefficients and applied errors on the left.

In a preferred embodiment of the present invention, the network trainer 403 achieves overall convergence at a dramatically accelerated rate by the following method.

The network trainer 403, while updating parameters using point-pair n in step 511 (of FIG. 6), does not simply set $\Delta ERR_{applied,n}$ to $\Delta ERR_{actual,n}$, to thereby exactly correct $\Delta OUT$.

Instead, the network trainer 403 anticipates the subsequent change in $\Delta OUT$ as evaluated at the point-pair n due to subsequent updating of parameters using a number U of other point-pairs. The network trainer 403 selects the correction $\Delta ERR_{applied}$ used for updating at all U point-pairs such that, together, they cause $\Delta OUT$ to change exactly by the correct amount as evaluated at all point-pairs U.

In particular, the network trainer 403 includes a coupling calculator, not pictured, that calculates the coupling matrix of Equation (57). The network trainer 403 then selects the $\Delta ERR_{applied}$ for all U training data point-pairs such that they satisfy Equation (57). A person skilled in the art would know that $\Delta ERR_{applied}$ can be selected to satisfy Equation (57) using standard linear algebra techniques such as Gaussian elimination.

As a review the equations used to calculate the change in the parameter values will now be shown.

$$\Delta a_{ij} = \sum_{n=1}^{U}\left(\left.\frac{d\,\Delta OUT}{d\,a_{ij}}\right|_n\right)\frac{\Delta ERR_{applied,n}}{K_{\Delta,n}} \quad (58)$$

where:

$$K_{\Delta,n} = \sum_{all\,ij}\left(\left.\frac{d\,\Delta OUT}{d\,a_{ij}}\right|_n\right)^2 \quad (59)$$

Computer Structures that Permit Easier Setup of Program

The C++ programming language has a number of built in procedures that make the task writing a neural network program easier. This is: the variable that passes down the network during training, level and change of level, can be defined as a structure. The C++ program permits the overloading of operator for multiplication and addition so the these structures can be treated as variables in the expression. This permits an equation like the following that hides from view all the mathematics required for the multiplication and addition of these structures.

$$out=a[0]+a[1]*x[0]a[2]*x[1]+a[3]*x[0]*x[1] \quad (60)$$

This procedure can also be used during the reverse or back calculation of the derivative up the network. The derivative, containing $d\Delta OUT/d\Delta out$ and $d\Delta OUT/dout$, can be defined as a structure; and so can $dout/dx$, containing $d\Delta out/\Delta dx$, $d\Delta out/dx$ and $dout/dx$ be defined as a structure. These structures can then be multiplied to assist in the calculation of the derivatives of the node output of the next higher layer, etc.

Problem Occurring During Initial Training

The previous discussion on the training of the network was based upon the linear independence of the parameters. This assumption is the worst when the network is first being trained. If the network shown in FIG. 2 has had the parameters set to random values, any change in the input values will have very little impact on the output. A typical example is that a typical input change of 1.0 produces an output change which can be as low as $10^{-10}$, etc. The equation used to calculate the output previously was (in the linear case):

$$\sum_{j=1}^{n}a_j x_j = out \quad (61)$$

Due to the interaction of the parameters this equation must be modified.

$$\sum_{j=1}^{n/layer}\left(\prod_{i=1}^{layer}a_{ij}\right)x_j = out \quad (62)$$

The pi symbol in the above equation represents a multiplication of the parameters. The calculations made in this section will be based upon the above equation. To continue the calculations change of parameters and error will be introduced in the above equation.

$$\sum_{j=1}^{n/layer}\left(\prod_{i=1}^{layer}(a_{ij} + change\ a_{ij})\right)x_j = out + error \quad (63)$$

If that $a_{ij}$ in the above equation is made equal to the MED_PAR a median parameter value, the equation can be rearranged to:

$$\left(1 + \frac{change\ MED\_PAR}{MED\_PAR}\right)^{layer}\sum_{j=1}^{n/layer}\left(\prod_{i=1}^{layer}a_{ij}\right)x_j = out + error \quad (64)$$

By using the results of Equation (62) to eliminate the summation sign etc. and rearranging:

$$\left(1 + \frac{change\ MED\_PAR}{MED\_PAR}\right)^{layer} = 1 + \frac{error}{out} \quad (65)$$

The above equation can be rearranged to:

$$change\ MED\_PAR = MED\_PAR\left(\left[1 + \frac{error}{out}\right]^{1/layer} - 1\right) \quad (66)$$

The output of this procedure should be error that should be applied given the error that exist. To accomplish this, the results of Equation (61) will be used. By using Equation (61) the relationship between $ERR_{applied}$ and change $a_{ij}$ can be expressed.

$$\sum_{i=1}^{n}(change\ a_i)x_i = ERR_{applied} \quad (67)$$

If it is assumed that the $x_i$ in the above equation is the median derivative then the equation can be simplified to:

$$n(change\ MED\_PAR)(MED\_DERIV) = ERR_{applied} \quad (68)$$

By solving the above equation for change MED_PAR and equating the results with equation (66):

$$ERR_{applied} = n(MED\_PAR)(MED\_DERIV)\left(\left[1 + \frac{error}{out}\right]^{1/layer} - 1\right) \quad (69)$$

where
MED_PAR=median value of parameter.
MED_DERIV=median value of derivative of parameter.
n=number of parameters.
out=actual output of network.

Equation is now be developed for calculating these median values. To do this the following equations are used:

$$PAR\_SUM = \sum_{i=1}^{n} a_i \quad (70)$$

$$MED\_PAR = \sqrt{\frac{PAR\_SUM}{n}} \quad (71)$$

$$MED\_DERIV = \sqrt{\frac{K}{n}} \quad (72)$$

where K=proportional constant used calculate the change in parameter given the derivative and error.

The remaining problem in the application of this Equation (69) is in taking the number of layers root of a real value. This is done by using logarithms and exponential functions as is illustrated in the following code fragment:

```
med_par=sqrt(sum_par/n);
med_deriv=sqrt(K/n);
correct=n*med_par*med_deriv*sign(error)*
    (exp(log(1.0+absd(error/out))/K_MAX)-1.0);
return (correct);
}
```

Some of the special functions that were created and used in the above code fragment are:

sign(error) which returns a value of +1.0 or −1.0 depending on the sign of the passed variable.

absd(error/out) which returns a positive double of the value passed.

The above technique used to automatically reduce the amount of correction applied when the network is first being trained is of course not the only one available, but it is one that has been tested and works adequately.

Practical Application

There are many practical applications of this technology. These include applications in which you are designing a computer system capable of learning a function as f(x), where x is an array of input variables. The function is being mapped or learned using a power series, etc. and the network is being used to build the power series.

It may also be used to learn logic. The input levels representing true or false etc. could be 1.0 and 0.0, respectively. This in turn could be used in the design of a classifier. The classifier receives input on the presents or absence of characteristics and the outputs could be class membership.

While the above is a complete description of specific embodiments of the invention, various modifications, alternative constructions, and equivalents may be used. Therefore, the above description should not be taken as limiting the scope of the invention as defined by the claims.

What is claimed is:

1. In an information processing system, a method for training a neural network, said neural network comprising a plurality of interconnected nodes having inputs and outputs, said inputs and outputs including a plurality of network inputs and a network output, said neural network including at least one network parameter, the method comprising the steps of:

(a) accepting training data;

(b) deriving from said training data a change in network input values between two data points from said training data;

(c) deriving from said training data a corresponding desired change in network output value between said two data points;

(d) computing an actual change in network output value using said change in network input values, said network including at least one node producing a product of at least two inputs or a product of an input multiplied by itself;

(e) computing a difference-error, said difference-error being a difference between said desired change in network output and said actual change in network output;

(f) computing an adjustment value for one of said network parameters, said adjustment value including a difference-error-applied, said difference-error-applied derived at least in part from said difference-error; and (g) adjusting said one network parameter by an amount derived at least in part from said adjustment value.

2. The method according to claim 1 further comprising the step of:

(h) computing a derivative of change in network output value with respect to said one parameter;

wherein step (f) of computing said adjustment value comprises computing said adjustment value to include said derivative.

3. The method according to claim 2 wherein step (h) of computing said derivative comprises computing said derivative in an order from an output layer of nodes within said neural network to an input layer of nodes within said neural network.

4. The method according to claim 3 wherein step (h) of computing said derivative comprises using the chain rule to compute a closed-form expression for said derivative.

5. The method according to claim 1 wherein step (f) of computing said adjustment value comprises setting said difference-error-applied to said difference-error for computing said adjustment value.

6. the method according to claim 1 further comprising the step of:
(i) computing said difference-error-applied from said difference-error to compensate for coupling between multiple pairs of training points according to a solution to a linear equation, in which linear equation the difference-error of multiple data points are the product of coupling coefficients and difference-error-applied of said multiple pairs of data points.

7. The method according to claim 1, wherein:
said two training data points are henceforth referred to as the first data point-pair; and
the step (f) includes computing a coupling from said first data point-pair to a second data point-pair in deriving said difference-error-applied from said difference-error.

8. The method according to claim 1 wherein step (d) of computing an actual change in network output value comprises running a training network using said change in network input values, said training network having a same topology as said neural network but with an output that is a change in network output.

9. The method according to claim 1 wherein said training data comprises values for said network inputs and characterization of desired network output values corresponding to said network input values.

10. A neural network produced according to the training method of claim 1.

11. In an information processing system, a method for training a neural network, said neural network comprising a plurality of interconnected nodes, each node having at least one input and at least one output, said network having network inputs and a network output, said neural network including at least one network parameter, the method comprising the steps of:
(a) constructing a training network from said neural network, said training network accepting differential inputs and producing a differential output;
(b) accepting training data;
(c) deriving differential input values from said training data;
(d) deriving a desired differential output value corresponding to said differential input values from said training data;
(e) running said training network using said differential input values to compute an actual differential output value, said network including at least one node producing a product of at least two inputs or a product of an input multiplied by itself;
(f) computing a differential-error, said differential-error being a difference between said desired differential output and said actual differential output;
(g) computing an adjustment value for one of said network parameters, said adjustment value including a differential-error-applied, said differential-error-applied derived at least in part from said differential-error; and
(h) adjusting said one network parameter by an amount derived at least in part from said adjustment value.

12. The method according to claim 11 wherein:
said differential input values are a change in network input values between two data points from said training data;
said differential output values, desired and actual, are change in network output value, desired and actual, respectively, between said two data points, whereby said differential-error is a difference-error, which difference-error is an error between said desired change in network output value and said actual change in network output value;
said differential-error-applied is a difference-error-applied, said difference-error-applied derived at least in part from said difference-error.

13. The method according to claim 11 wherein:
said differential input values are a slope of network input values;
said differential output values, desired and actual, are slope of network output value, desired and actual, respectively, whereby said differential-error is a slope-error, which slope-error is an error between said desired slope of network output value and said actual slope of network output value;
said differential-error-applied is a slope-error-applied, said slope-error-applied derived at least in part from said slope-error.

14. The method according to claim 11 further comprising the step of:
(i) computing a derivative of differential network output value with respect to said one parameter;
wherein step (g) of computing said adjustment value comprises computing said adjustment value to include said derivative.

15. A computer program product, for a computer system including a processor and a memory, the computer program product for training a neural network using a training network, said neural network comprising a plurality of interconnected nodes having inputs including at least one network input and outputs including a network output, at least one of said nodes realizing a function of its inputs at an output, said function comprising at least one function parameter, the computer program product comprising:
a computer readable storage medium comprising:
(a) code that directs the processor to accept training data;
(b) code that directs the processor to derive differential input values from said training data;
(c) code that directs the processor to derive a desired differential output value corresponding to said differential input values from said training data;
(d) code that directs the processor to run said training network using said differential input values to compute an actual differential output value, including code that produces a product of at least two inputs in at least one of said nodes;
(e) code that directs the processor to compute an differential-error, said differential-error being a difference between said desired differential output and said actual differential output;
(f) code that directs the processor to compute an adjustment value for one of said network parameters, said adjustment value including a differential-error-applied, said differential-error-applied derived at least in part from said differential-error; and
(g) code that directs the processor to adjust said one network parameter by an amount derived at least in part from said adjustment value.

16. A computerized system for training a neural network, said neural network comprising a plurality of interconnected nodes, each node having at least one input and at least one output, said neural network having at least one network input and one network output, said neural network comprising function parameters, the system comprising:

(a) an input stage for accepting training data, said input stage configured to derive differential input values and a desired differential output value from said training data;

(b) a network evaluator configured to run a training network corresponding to said neural network, using said differential input values, in obtaining a differential-error based on said desired differential output value, said neural network including at least one node producing a product of at least two inputs or the product of one input multiplied by itself;

(c) a parameter updater configured to compute an adjustment value for a parameter from said network parameters, said adjustment value including a differential-error-applied, said differential-error-applied derived at least in part from said differential-error, said parameter updater also configured to adjust said network parameter according to said adjustment value.

17. The system according to claim 16 wherein:

said parameter updater includes a coupling calculator for computing a coupling from a first set of said differential input values and to a second set of differential input values; and said parameter updater is configured to derive said differential-error-applied from said differential-error using said coupling to thereby compensate for said coupling.

* * * * *